US009070487B2

(12) United States Patent
Kayamoto et al.

(10) Patent No.: US 9,070,487 B2
(45) Date of Patent: Jun. 30, 2015

(54) CONDUCTIVE MEMBER

(75) Inventors: Takashi Kayamoto, Kanagawa (JP); Shinji Saito, Kanagawa (JP); Yuichiro Yamauchi, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 13/977,968

(22) PCT Filed: Dec. 26, 2011

(86) PCT No.: PCT/JP2011/080125

§ 371 (c)(1),
(2), (4) Date: Jul. 2, 2013

(87) PCT Pub. No.: WO2012/093614

PCT Pub. Date: Jul. 12, 2012

(65) Prior Publication Data

US 2013/0292152 A1 Nov. 7, 2013

(30) Foreign Application Priority Data

Jan. 7, 2011 (JP) ................................ 2011-002212

(51) Int. Cl.

| | |
|---|---|
| ***B32B 15/00*** | (2006.01) |
| ***H01B 5/02*** | (2006.01) |
| ***C23C 24/04*** | (2006.01) |
| ***H01B 1/02*** | (2006.01) |

(52) U.S. Cl.

CPC *H01B 5/02* (2013.01); *C23C 24/04* (2013.01); *H01B 1/02* (2013.01)

(58) Field of Classification Search

CPC ............. C23C 2/02; C23C 2/12; C23C 4/02; C23C 4/08; C23C 10/06; C23C 10/30

USPC .......................... 428/548, 555, 615, 618, 650

See application file for complete search history.

(56) References Cited

U.S. PATENT DOCUMENTS

| | | | |
|---|---|---|---|
| 5,302,414 | A | 4/1994 | Alkhimov et al. |
| 6,204,480 | B1 | 3/2001 | Woodard et al. |

FOREIGN PATENT DOCUMENTS

| | | | |
|---|---|---|---|
| CN | 101797669 | A | 8/2010 |
| JP | 05-093254 | A | 4/1993 |
| JP | 11-154435 | A | 6/1999 |

(Continued)

OTHER PUBLICATIONS

Office Action dated Aug. 13, 2013, issued for the corresponding Japanese patent application No. 2011-002212 and English translation thereof.

(Continued)

*Primary Examiner* — Cathy Lam

(74) *Attorney, Agent, or Firm* — Locke Lord LLP; James E. Armstrong, IV; George N. Chaclas

(57) ABSTRACT

A conductive member disposed as a power supply line and the like includes: a first conductive material and a second conductive material, at least one of which includes a conductive material having electrical resistance lower than that of aluminum; and a metal film formed by depositing powder including a metal, which is accelerated together with a gas and sprayed, in a sold state, onto a surface of a butting part, where the first conductive material and the second conductive material are butted against each other.

3 Claims, 3 Drawing Sheets

(56) References Cited

FOREIGN PATENT DOCUMENTS

| | | | |
|---|---|---|---|
| JP | 2003-115285 | A | 4/2003 |
| JP | 2003-522391 | A | 7/2003 |
| JP | 2009-068032 | A | 4/2009 |
| JP | 2010-016945 | A | 1/2010 |
| JP | 2010-162602 | A | 7/2010 |

OTHER PUBLICATIONS

Notice of Rejection mailed Nov. 12, 2013, issued for the corresponding Japanese patent application No. 2011-002212 and English translation thereof.

International Search Report dated Feb. 7, 2012, issued for PCT/JP2011/080125.

Office Action dated Jul. 25, 2014, issued for the corresponding Chinese patent application No. 201180053714.1.

CONDUCTIVE MEMBER

FIELD

The present invention relates to a conductive member, which is used when an electrode, an electrical wire, and the like are electrically connected.

BACKGROUND

A conductive member called a bus bar, which is a metal disposed as a power transmission line and the like, has conventionally been used in power plants, electric systems of transportation machines such as a vehicle, home electric appliances, and the like. The bus bar is in an elongated flat plate shape or in a long and thin rod shape, and due to a large surface area thereof, it has high heat dissipation and superior conductivity for allowing a large current to be flowed therein.

In addition to the heat dissipation and the conductivity, weight saving and cost reduction are also sought after in the above-described bus bar. To meet such a demand, for example, there has been proposed a compound electrode combining aluminum, which is lightweight and low-cost, with copper, which has high electrical conductivity. Among methods for joining two metals in this compound electrode, there are welding, a thermal spraying method, and a cold spraying method. The thermal spraying method is a method of forming a film by spraying a thermal spraying material, which is heated to a molten or nearly-molten state, onto a substrate.

The cold spraying method is a method of forming a film on a surface of the substrate by spraying powder of a material to be the film together with an inert gas, which is below a melting point or a softening point, from a convergent-divergent (Laval) nozzle. The material to be the film, which is in a solid state, is collided with the substrate (see, for example, Patent Document 1). In the cold spraying method, compared to the welding and the thermal spraying method, an influence of thermal stress is mitigated because a temperature used is low, no phase transformation occurs, and oxidization can be inhibited. Therefore, it is possible to obtain a metal film in which a decrease of electrical conductivity is restrained. In particular, in the case where both the substrate and the material to be the film are metal, plastic deformation occurs between the powder and the substrate by the powder to be the film colliding with the substrate, whereby an anchor effect can be obtained. Furthermore, in an area where the plastic deformation occurs, respective oxide films are destroyed when the powder collides with the substrate, and a metallic bond is formed between newly-formed surfaces, whereby an effect of obtaining a laminate having a high adhesive strength is also expected.

CITATION LIST

Patent Literature

Patent Literature 1: U.S. Pat. No. 5,302,414

SUMMARY

Technical Problem

In the case of manufacturing a bus bar having a thin substrate, however, joining by the cold spraying method as disclosed in Patent Literature 1 raises a problem of an increased cost due to cutting work, because after a base material is manufactured by forming a metal film on the substrate, the base material needs to be cut into an intended substrate thickness.

The present invention has been made in view of the above, and an object thereof is to provide a conductive member in which a plurality of conductive materials can be joined at a low cost regardless of the substrate thickness and which has a good electrical conductivity.

Solution to Problem

To solve the problem described above and achieve the object, a conductive member according to the present invention includes: a first and a second conductive materials, at least one of which contains a conductive material having electrical resistance lower than aluminum; and a metal film formed by depositing powder including a metal, which is accelerated together with a gas and sprayed, in a solid state, onto a surface of a butting part, where the first and the second conductive materials are butted against each other.

Moreover, in the conductive member described above, each of the first and the second conductive materials includes a cutout portion having a cutout shape in an end on a butting side, and the metal film covers the cutout portion.

Moreover, in the conductive member described above, the cutout portion has a tapered shape, which is inclined relative to each of principal surfaces of the first and the second conductive materials.

Moreover, in the conductive member described above, the cutout portion has an angle of inclination from zero to 45 degrees relative to each of the principal surfaces of the first and the second conductive materials.

Moreover, in the conductive member described above, the cutout portion has the angle of inclination from two to 35 degrees relative to each of the principal surfaces of the first and the second conductive materials.

Moreover, in the conductive member described above, the metal included in the metal film includes at least one selected from a group consisting of copper, molybdenum, aluminum, tungsten, nickel, silver, and an alloy containing at least one of them.

Moreover, in the conductive member described above, another one of the first and the second conductive materials is aluminum or an aluminum alloy.

Advantageous Effects of Invention

A conductive member according to the present invention is configured to join conductive materials by forming a film by a cold spraying method so as to cover at least a part of a contacting part of the conductive materials, which are in contact. Therefore, it has an effect that a plurality of conductive materials can be joined at a low cost regardless of a substrate thickness.

DESCRIPTION OF EMBODIMENTS

Embodiments for carrying out the present invention are described herein in detail with reference to the drawings. Note that the following embodiments are not intended to limit the present invention. Furthermore, each of the drawings referred to in the following descriptions is only a schematic illustration of a shape, a size, and a positional relationship to make a content of the present invention understandable. In other words, the present invention is not to be limited to the shape, the size, and the positional relationship exemplified in each of the drawings.

(First Embodiment)

Figure 1:
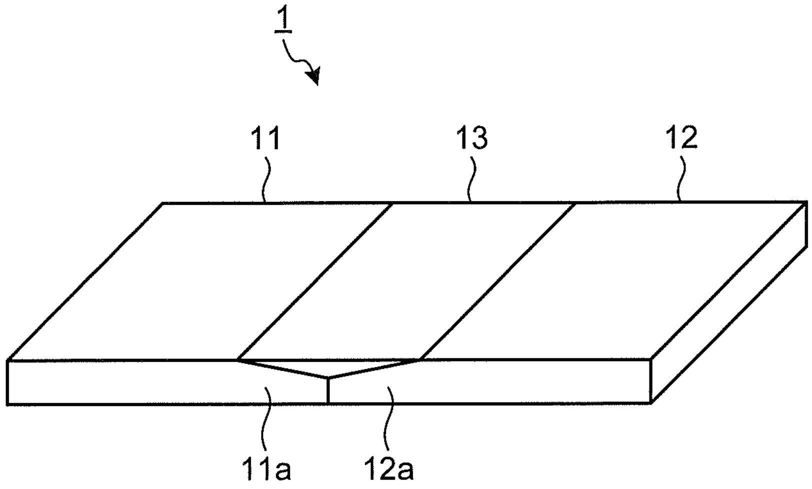
FIG. 1 is a schematic perspective view illustrating a configuration of a conductive member according to a first embodiment of the present invention.
Figure 2:
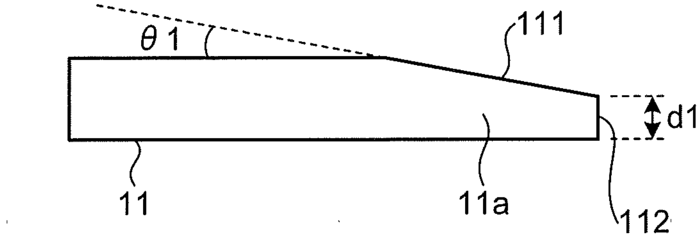
FIG. 2 is a schematic view illustrating a configuration of a principal part of the conductive member according to the first embodiment of the present invention.

First, a conductive member according to a first embodiment of the present invention is described herein in detail with reference to the drawings. FIG. 1 is a schematic perspective view illustrating a configuration of the conductive member according to the first embodiment. FIG. 2 is a schematic view illustrating a configuration of a principal part of the conductive member according to the first embodiment. A conductive member 1 illustrated in FIG. 1 is disposed as a power supply line and the like and includes a substantially plate-like first conductive material 11, which contains a lightweight and low-cost conductive material, a substantially plate-like second conductive material 12, which contains a conductive material having high electrical conductivity, and a metal film 13, which is formed between the first conductive material 11 and the second conductive material 12.

The first conductive material 11 is substantially plate-like and includes a tapered portion 11*a*, which has a tapered shape at one of ends. The first conductive material 11 is formed of a lightweight and low cost material such as aluminum and an aluminum alloy.

The second conductive material 12 is substantially plate-like and includes a tapered portion 12*a*, which is a cutout portion having a tapered shape at one of ends. The second conductive material 12 is formed of a material having the high electrical conductivity such as copper, a noble metal, a copper alloy and a noble metal alloy which have electrical resistance lower than aluminum.

The tapered portion 11*a*, as illustrated in FIG. 2, includes an inclined plane 111, which is formed by cutting out one of faces of the first conductive material 11 and has a tapered shape, and an end face 112, which comes in contact with the second conductive material 12. Here, an angle of inclination $\theta 1$ between the inclined plane 111 and a principal surface of the first conductive material 11 is in the range of zero to 45 degrees. More preferably, the angle of inclination $\theta 1$ is in the range of two to 35 degrees. Furthermore, in the tapered portion 11*a*, it is preferable that a thickness d1 of the end face 112 be 0.1 to 0.5 times a maximum thickness of the first conductive material 11 after a tapered shape has been formed.

The tapered portion 12*a* has the same angle of inclination and the same thickness as the above-described tapered portion 11*a*. Note that it is preferable that the angle of inclination and the thickness of the end face be the same between shapes of the tapered portion 11*a* and the tapered portion 12*a*.

The metal film 13 is formed on a surface of the tapered portion 11*a* of the first conductive material 11 and a surface of the tapered portion 12*a* of the second conductive material 12 by the cold spraying method described below. As the metal film 13 (film material), a metal such as copper, molybdenum, aluminum, tungsten, nickel, silver, or the like, and an alloy containing at least one of these metals may be used. Here, as the metal film 13, a metal or an alloy having density of 95% or more and thermal conductivity of 90% or more relative to a bulk material is applicable.

Note that in the first embodiment, it is preferable that a combination be used in which copper or a copper alloy is used as the first conductive material 11, aluminum or an aluminum alloy is used as the second conductive material 12, and copper or a copper alloy is used as the metal film 13.

Figure 3:
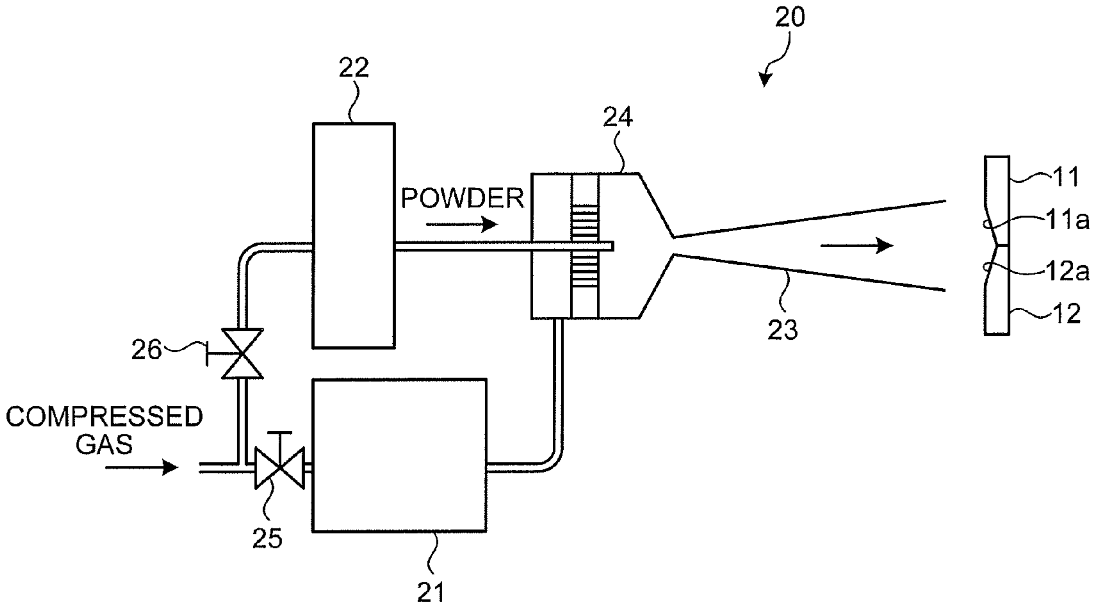
FIG. 3 is a schematic view illustrating an outline of a cold spraying device used for manufacturing the conductive member according to the first embodiment of the present invention.

Then, forming of the metal film 13 is described with reference to FIG. 3. FIG. 3 is a schematic view illustrating an outline of a cold spraying device used for forming the metal film 13. The forming of the metal film 13 by the cold spraying method is performed, for example, by using a cold spraying device 20 illustrated in FIG. 3.

The cold spraying device 20 includes a gas heater 21, which heats a compressed gas, a powder supply device 22, which houses a powdered material thermal-sprayed onto an object to be thermal-sprayed and supplies the powdered material to a spray gun 24, and a gas nozzle 23, which sprays material powder mixed with the compressed gas heated inside the spray gun 24 onto the tapered portions 11*a* and 12*a* of the first conductive material 11 and the second conductive material 12.

Helium, nitrogen, air, or the like may be used as the compressed gas. The supplied compressed gas is supplied to the gas heater 21 and the powder supply device 22 through valves 25 and 26, respectively. The compressed gas supplied to the gas heater 21 is heated to, for example, between 50 and 700 degrees, and then it is supplied to the spray gun 24. More preferably, the compressed gas is heated so that an upper limit temperature of the powder, which is sprayed onto the tapered portions 11*a* and 12*a*, is kept to be not exceeding the melting point of the film material. By keeping the heating temperature of the powdered material to be not exceeding the melting point of the film material, it is possible to inhibit oxidization of the film material.

The compressed gas supplied to the powder supply device 22 supplies the material powder having a particle diameter of about 10 to 100 μm, for example, inside the powder supply device 22 to the spray gun 24 in a predetermined discharge quantity. The heated compressed gas is made into a supersonic flow (about 340 m/s or above) by the gas nozzle 23, which has a convergent-divergent shape. The powdered material supplied to the spray gun 24 is accelerated by being put into this supersonic flow of the compressed gas and, while in the solid state, collides with forming faces of the tapered portions 11*a* and 12*a* at a high speed, whereby the film is formed.

By the above-described cold spraying device 20, the metal film 13 as illustrated in FIG. 1 is formed. Note that any device capable of forming the film by colliding the material powder in a solid state with the tapered portions 11*a* and 12*a* may be used, and it is not limited to the cold spraying device 20 illustrated in FIG. 3.

In the above-described processing, it is possible to cover the surfaces of the tapered portion 11*a* of the first conductive material 11 and the tapered portion 12*a* of the second conductive material 12 with the metal film 13. Note that in a case where there the surfaces of the first conductive material 11 and the second conductive material 12 are different from the forming face of the metal film 13 after the forming of the film, surface processing such as cutting may be applied as necessary to adjust the shape of the surface.

The conductive member according to the above-described first embodiment is configured to join two conductive materials by forming the metal film in the butting part thereof by the cold spraying method. Therefore, a plurality of conductive materials can be joined at a low cost regardless of the substrate thickness while also achieving good electrical conductivity. Furthermore, in the cold spraying method, compared to the welding, the thermal spraying method, or the like in which a high temperature is used in the processing, it is possible to form a fine metal film in which no phase transformation occurs, and oxidization is inhibited. Therefore, a metallic character of the metal film formed by the cold spraying method is better than a metallic character of the metal film formed by the thermal spraying method or the like. Accordingly, the electrical conductivity of the metal film is improved, and even more efficient electrical conductivity can be realized.

Furthermore, compared to existing processing in which the base material is manufactured by forming a metal film on the substrate by the cold spraying method and then by being cut into an intended thickness, the conductive member according to the first embodiment has no cutting process. Therefore, it is possible to manufacture the conductive member easily in a short time, improve a yield, and reduce the cost of manufacturing.

Furthermore, since the conductive materials are joined by forming the tapered portion having an inclined forming face in each of the conductive materials and by coating the tapered portion with the metal film, compared to a case where the conductive materials are joined only by butting without forming a tapered portion, a contact area between the conductive materials via the metal film is increased, whereby the electrical resistance can be decreased. Accordingly, the high electrical conductivity can be realized.

Note that the tapered portion has been described as a cutout shape having a plane, which is inclined relative to the principal surface of the conductive material; however, the forming face having the tapered shape may also be in an arc-like curved shape. Furthermore, the inclined plane of the tapered portion has been described as being formed on one of the faces of the conductive material; however, it can also be formed on both of the faces.

(Second Embodiment)

Figure 4:
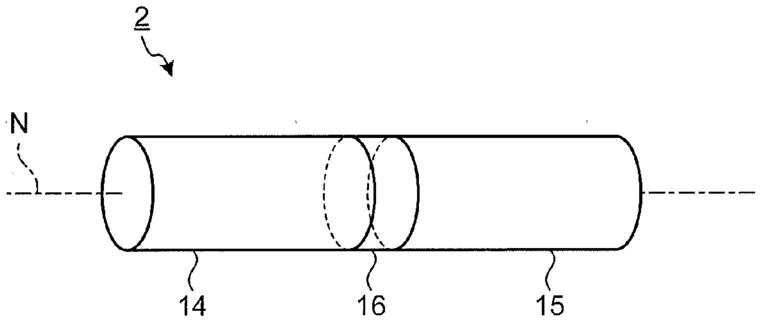
FIG. 4 is a schematic perspective view illustrating a configuration of a conductive member according to a second embodiment of the present invention.
Figure 5:
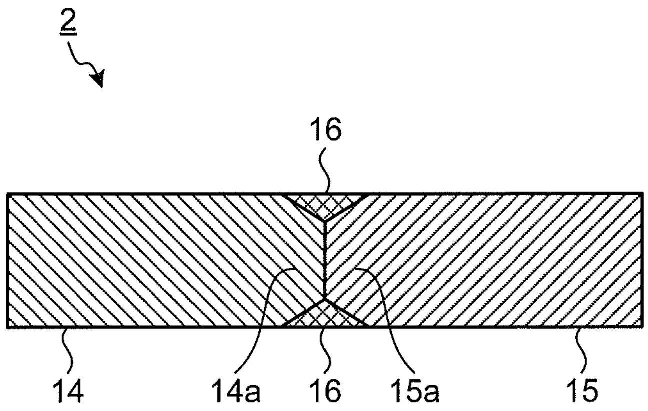
FIG. 5 is a schematic cross-sectional view illustrating a configuration of a principal part of the conductive member according to the second embodiment of the present invention.
Figure 6:
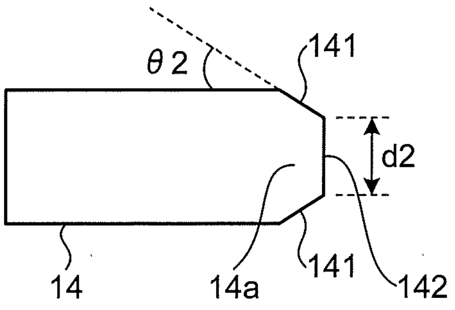
FIG. 6 is a schematic view illustrating a configuration of a principal part of the conductive member according to the second embodiment of the present invention.

Next, a conductive member according to a second embodiment of the present invention is described in detail with reference to the drawings. FIG. 4 is a schematic perspective view illustrating a configuration of a conductive member according to the second embodiment. FIG. 5 is a schematic cross-sectional view illustrating a configuration of a principal part of the conductive member according to the second embodiment. Note that FIG. 5 is the cross-sectional view of a conductive member 2 illustrated in FIG. 4, which is cut through a plane including a central axis N in a longitudinal direction. Furthermore, FIG. 6 is a schematic view illustrating a first conductive material 14. The conductive member 2 illustrated in FIG. 4 includes the substantially cylindrical first conductive material 14, which contains a lightweight and low cost conductive material, a substantially cylindrical second conductive material 15, which contains a conductive material having high electrical conductivity, and a metal film 16, which is formed between the first conductive material 14 and the second conductive material 15.

The first conductive material 14 is substantially plate-like and includes a tapered portion 14*a*, which has a tapered shape at one of ends. The first conductive material 14 is formed of a lightweight and low cost material such as aluminum and an aluminum alloy.

The second conductive material 15 is substantially plate-like and includes a tapered portion 15*a*, which has a tapered shape at one of ends. The second conductive material 15 is formed of a material having high electrical conductivity such as copper, a noble metal, a copper alloy and a noble metal alloy.

The metal film 16 is formed on surfaces of the tapered portion 14*a* of the first conductive material 14 and the tapered portion 15*a* of the second conductive material 15 by the cold spraying device 20 illustrated in FIG. 3. The metal film 16 can be a metal such as copper, molybdenum, aluminum, tungsten, nickel, silver, or the like, and an alloy thereof. Here, as the metal film 16, a metal or an alloy having density of 95% or more and thermal conductivity of 90% or more relative to a bulk material is applicable.

The tapered portion 14*a*, as illustrated in FIG. 6, includes an inclined plane 141, which is formed by chamfering an end of the first conductive material 14 and has a tapered shape, and an end face 142, which comes in contact with the second conductive material 15. Here, an angle of inclination θ2 between the inclined plane 141 of the tapered portion 14*a* and a principal surface of the first conductive material 14 is in the range of zero to 45 degrees as in the first embodiment. More preferably, the angle of inclination θ2 is in the range of two to 35 degrees. Furthermore, in the tapered portion 14*a*, it is preferable that a diameter d2 of the end face 142 be 0.1 to 0.5 times the maximum diameter of the first conductive material 14 in a direction perpendicular to the central axis N after a tapered shape has been formed.

The tapered portion 15*a* has the same angle of inclination and the same diameter of the end face as the above-described tapered portion 14*a*. Note that it is preferable that the angle of inclination and the diameter of the end face be the same between shapes of the tapered portion 14*a* and the tapered portion 15*a*.

The conductive member according to the above-described second embodiment, in the same way as the first embodiment, is configured to join two conductive materials by forming the metal film in the butting part thereof by the cold spraying method. Therefore, a plurality of conductive materials can be joined at a low cost regardless of the substrate thickness while achieving good electrical conductivity. Furthermore, in the cold spraying method, compared to the welding, the thermal spraying method, or the like in which a high temperature is used in the processing, it is possible to form a fine metal film in which no phase transformation occurs, and oxidization is inhibited. Therefore, a metallic character of the metal film formed by the cold spraying method is better than a metallic character of the metal film formed by the thermal spraying method or the like. Accordingly, the electrical conductivity of the metal film is improved, and even more efficient electrical conductivity can be realized.

Furthermore, existing processing, in which the base material is formed by forming a metal film on the substrate by the cold spraying method and then by being cut into an intended thickness, is difficult to perform on the cylindrical conductive member according to the second embodiment because of the cutting. The conductive member according to the second embodiment, however, has no cutting process. Therefore, it is possible to manufacture the conductive member easily in a short time, improve a yield, and reduce the cost of manufacturing.

Furthermore, since the conductive materials are joined by forming the tapered portion having an inclined forming face in each of the conductive materials and by coating the tapered portion with the metal film, compared to a case where the conductive materials are joined only by butting without forming a tapered portion, a contact area between the conductive materials via the metal film is increased, whereby the electrical resistance can be decreased. Accordingly, the high electrical conductivity can be realized.

INDUSTRIAL APPLICABILITY

As above, the conductive member according to the embodiments of the present invention is effective for manufacturing the conductive member by joining a plurality of conductive materials.

REFERENCE SIGNS LIST

1, 2 Conductive member
11, 14 First conductive material
11*a*, 12*a*, 14*a*, 15*a* Tapered portion
12, 15 Second conductive material
13, 16 Metal film
20 Cold spraying device
21 Gas heater
22 Powder supply device
23 Gas nozzle
24 Spray gun
25, 26 Valve

The invention claimed is:

1. A conductive member comprising:

a first and a second conductive materials, at least one of which contains a conductive material having electrical resistance lower than aluminum; and a metal film formed by depositing powder including a metal, the powder being accelerated together with a gas and sprayed, in a solid state, onto a surface of a butting part, where the first and the second conductive materials are butted against each other, wherein another one of the first and the second conductive materials is aluminum or an aluminum alloy, wherein each of the first and the second conductive materials includes a cutout portion having a cutout shape in an end on a butting side, the metal film covers the cutout portion, the cutout portion has a tapered shape, which is inclined relative to each of principal surfaces of the first and the second conductive materials, and the cutout portion has an angle of inclination from zero to 45 degrees relative to each of the principal surfaces of the first and the second conductive materials.

2. The conductive member according to claim 1, wherein the cutout portion has the angle of inclination from two to 35 degrees relative to each of the principal surfaces of the first and the second conductive materials.

3. The conductive member according to claim 1, wherein the metal included in the metal film includes at least one selected from a group consisting of copper, molybdenum, aluminum, tungsten, nickel, silver, and an alloy containing at least one of them.

* * * * *